United States Patent [19]

Still et al.

[11] 4,396,656

[45] Aug. 2, 1983

[54] LONGITUDINALLY DIVIDED HOSE-LIKE FILLING

[75] Inventors: Michael Still; Hermann-Uwe Voigt, both of Langenhagen; Georg Maltz, Burgdorf; Frank Patzke, Lehrte, all of Fed. Rep. of Germany

[73] Assignee: Kabel-und Metallwerke Gutehoffnungshütte Aktiengesellschaft, Hanover, Fed. Rep. of Germany

[21] Appl. No.: 172,523

[22] Filed: Jul. 28, 1980

[30] Foreign Application Priority Data

Aug. 2, 1979 [DE] Fed. Rep. of Germany ....... 2931375
Jun. 9, 1980 [DE] Fed. Rep. of Germany ....... 3021623

[51] Int. Cl.³ .............................................. F16L 21/06
[52] U.S. Cl. ........................................ 428/36; 174/92; 174/DIG. 8; 285/381; 285/419
[58] Field of Search ............................. 285/381, 419; 174/DIG. 8, 92; 138/171; 428/36

[56] References Cited

U.S. PATENT DOCUMENTS

| 1,220,774 | 3/1917 | Murray | 138/171 X |
| 2,167,737 | 8/1939 | Anderson | 138/171 X |
| 2,739,018 | 3/1956 | Collett | 285/419 X |
| 2,916,308 | 12/1959 | Voldrich et al. | 285/381 X |
| 3,239,254 | 3/1966 | Campbell | 285/419 X |
| 3,455,336 | 7/1969 | Ellis | 174/DIG. 11 X |
| 3,530,898 | 9/1970 | Wilson | 285/381 X |
| 3,542,077 | 11/1970 | Muchmore | 285/381 X |
| 3,574,313 | 4/1971 | Tanaka | 285/381 X |
| 3,656,514 | 4/1972 | Kafka | 138/171 X |
| 3,910,448 | 10/1975 | Evans et al. | 174/DIG. 8 X |
| 3,916,955 | 11/1975 | Netterstedt et al. | 138/171 X |
| 4,123,047 | 10/1978 | Koht et al. | 174/DIG. 8 X |
| 4,241,119 | 12/1980 | Smart | 285/381 X |
| 4,283,239 | 8/1981 | Corke et al. | 174/DIG. 8 X |

FOREIGN PATENT DOCUMENTS

| 2820181 | 11/1979 | Fed. Rep. of Germany | 174/DIG. 8 X |
| 54-159722 | 12/1979 | Japan | 174/DIG. 8 X |
| 7508247 | 7/1975 | Netherlands | 174/92 |
| 1506242 | 4/1978 | United Kingdom | 174/DIG. 8 |

Primary Examiner—Thomas F. Callaghan
Attorney, Agent, or Firm—Ralf H. Siegemund

[57] ABSTRACT

A cable splice, tube joint, or the like, is covered by a fitting constructed as a split hose provided along one edge with a rail made of metal or a strong synthetic; a similar rail element or an integral fastening element is provided on the other edge and secured to the first rail by welding, adhesive bonding, or soldering in order to obtain a joint which resists tension and compression. The hose has been laterally slipped onto and over the cable splice or tube joint and, after the split joint has been sealed (or concurrently therewith), the hose is heat-shrunk. Various rail configurations are shown; a method of making the hose is explained.

10 Claims, 9 Drawing Figures

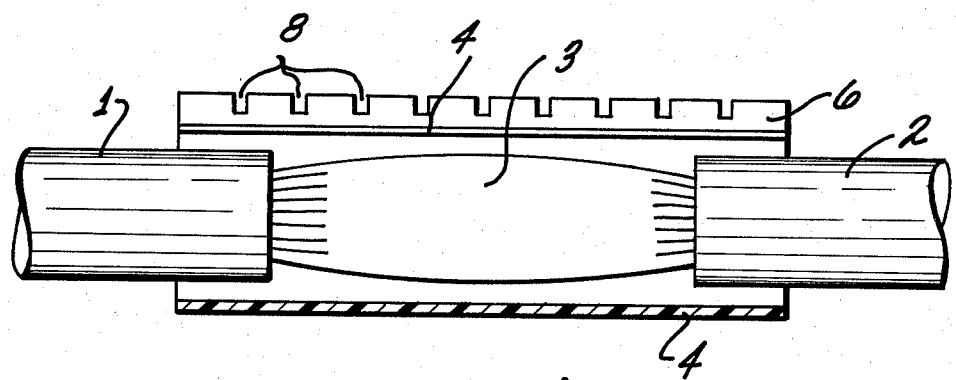
Fig. 1
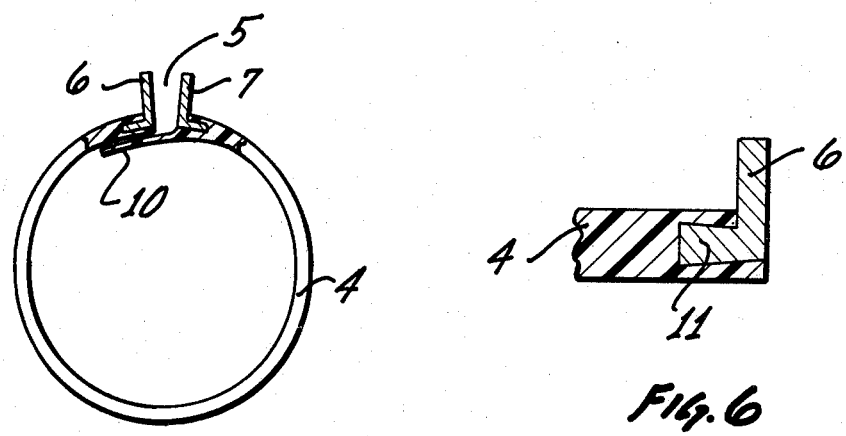
Fig. 2
Fig. 6
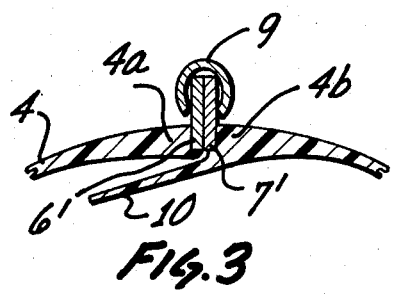
Fig. 3
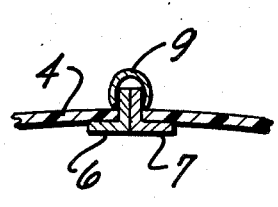
Fig. 4

LONGITUDINALLY DIVIDED HOSE-LIKE FILLING

BACKGROUND OF THE INVENTION

The present invention relates to a hose-like cover or fitting for electrical cables, tubes, or the like.

Covers and fittings of the type to which this invention pertains are used, for example, to cover joints, splices, terminators, fittings of any kind, and connecting elements for interconnecting different tubular parts, cables, branch connectors, and so forth. The invention has been developed particularly as a covering fitting to be used for cable splicings and similar constructions; but it has wider uses. Take the case of a connection between two long cables. A hose-like fitting for the completed connection, for example, must be slipped onto one of the cables before connecting is even begun. That simple step can easily be forgotten. Moreover, such a short, hose-like fitting can be provided and used only pursuant to the initial installation. At a later time, the need may arise that the connection to be repaired. A new cover cannot be provided unless the repair entails a complete physical disconnection.

In order to obviate this drawback, fittings have been developed which are comprised of a shrinkable hose being split along an axial line, to permit lateral placement upon the part or parts and joint to be covered (See U.S. Pat. No. 3,455,366). The fitting is subsequently closed along the line of the split. This closure is effected, as per a known method, by means of a metal rail element which is slid upon longitudinal projections of the hose (see, for example, U.S. Pat. No. 3,455,336). The rail must, indeed, sit very firmly on these projections; quite likely, the rail may dig into hose material and notch it when the rail is slipped on. Since, e.g., the fitting is subsequently heat-shrunk, these notches readily serve as the beginning of cracks which, of course, damage or even destroy the fitting.

Aside from the foregoing, it was found that this method of covering results in a rather wide, lateral extension on account of the rail; this is not always desirable or even tolerable.

DESCRIPTION OF THE INVENTION

It is an object of the present invention to provide a new and improved covering fitting for joints, splices, or the like, being impermeable to gas and liquid and resistant to tension and compression.

It is a specific object of the present invention to provide a new and improved heat shrinking, hose-like fitting which is longitudinally split to permit lateral placement upon a cable or tube joint, or the like.

In accordance with the preferred embodiment of the present invention, it is suggested to provide at least one of the edges of a split hose as per the specific object, with a rail being firmly embedded in or connected to the hose thereof; and the other edge is provided with suitable means such as another rail, a protrusion, and a ridge for positive connection with the first-mentioned rail. This fastening must resist tension and compression loads and may include bonding by an adhesive by welding or soldering, depending upon the material being used for the rail. At least one of the rails must be of a material, metal or synthetic, that is stronger than the hose material.

The hose is preferably extruded, and the rail or rails are embedded in the hose material as it is formed. The means on the other edge may be integral with the hose and formed as an integral part thereof.

The cover is laterally slipped onto a cable joint, splice, tube joint, or the like, and the rail element may be held (clamped) against the means on the other edge, or may otherwise be mechanically connected thereto. The rail and other means are then secured to each other by means of adhesive bonding, welding, soldering, or the like; and the hose is heat-shrunk to establish a light cover. The clamps can be removed subsequently.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1 illustrates schematically a cable splice or joint provided with a fitting in accordance with the preferred embodiment of the invention for practicing the best mode thereof:

FIG. 2 is a side or end elevation of the fitting shown in FIG. 1;

FIGS. 3 and 4 are details of the joint configuration of modified fillings;

FIG. 6 is an enlarged view of a detail of FIG. 2;

Proceeding now to the detailed description of the drawings, FIG. 1 illustrates two cable cores 1 and 2; e.g., cores of communication cables which are joined as generally designated by reference numeral 3. In particular, this connection may include a cable splice. Details of this connection are not relevant for the invention. Suffice it to say that known connection and cable-splicing techniques can be used. In any event, insulation has been stripped from the conductors; and without further steps, the connection zone and splice 3 would be unprotected. The need for covering such a splice has, of course, long been recognized. Presently, a new fitting for that purpose is being suggested.

Figure 5:
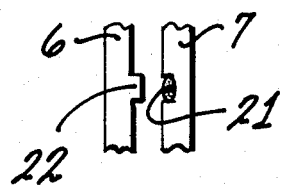
FIG. 5 is a top view of a detail applicable to FIGS. 2, 3, or 4.

The splice and connection zone of the two cables is covered by a hose 4 made from insulating material of the type that shrinks on application of heat. Thus, the hose has intially a rather wide diameter (as illustrated). This hose is basically of split tube construction, being provided along its longitudinal edges with rails or bars 6 and 7, having an L-shaped cross section (see FIG. 2).

The rails 6 and 7 are made of metal, brass or copper, or of a very strong synthetic material, such as polyamid. The hose material is relatively soft on account of the heat-shrinking requirement. Also, ease of placement and handling as well as contour adaptation around the splice, and so forth, require flexibility. It is for this reason that the rails are to be of a stronger material to complete a longitudinal joint along the split that is resistant against tension and compression.

The rails may be particularly contoured to enhance embedding and anchoring. As shown specifically in FIG. 6. The short leg of the L is of a dovetail construction; and upon being embedded in one edge zone of split hose 4, the rail is anchored and will resist pullout. Both rails can be connected to the hose in that fashion, or just one of them, if, in fact, only one rail is provided, as will be discussed more fully below.

FIG. 1 shows, in particular, the tube or hose-like fitting 4 in section, the section being taken in the plane of the tube's split so that only one rail, rail 6, is visible. The rails should be provided with slots 8 to enhance their flexibility.

The hose-like fitting element 4 is placed onto the cable ends by being slipped over the splice area 3 from below (as per FIG. 1), whereby rails 6 and 7 are spread apart, but will become situated rather closely when a slip-on is completed. The rails or bars 6 and 7 are subsequently forced towards each other and clamped together by means of clips (9), or the like. The joint is subsequently completed in a suitable manner which resists tension as well as pulling-apart. In addition, the hose 4 is heat-shrunk so that, in particular, the axial end portions will sit tightly on the cable end insulations. The clips or clamps 9 can be removed as soon as heat-shrinking and other means hold the rails firmly against each other. The engaging and abutting surfaces of rails or bars 6 and 7 are, for example, bonded together by a suitable adhesive, or otherwise as described below.

As was explained specifically with reference to FIGS. 2 and 6, the short leg portion of the L of profiled bars 6 and 7 are embedded in peripheral end portions of hose 4. They are sealed therein in a water- and air-tight manner. Bonding by means of an adhesive is well suited for completing the seal along the axial joint of the split hose 4.

In order to improve the tightness of engagement of the bars or rails 6 and 7, the abutment surfaces should themselves be profiled, to obtain interengaging abutment. This is particularly advisable if an adhesive is used for bonding the raise together. The long legs of the L may be provided with apertures to further enhance the bonding strength. The adhesive flows into and through the apertures to the other side so that overall bonding strength is improved.

As stated, the rails or bars may be made of metal, such as brass or copper. In this case, they may best be bonded together by means of soldering. Moreover, as shown in FIG. 5, one of the bars, such as bar 6, may be provided with at least one boss 22, and the other bar, 7, may have a recess to receive solder 21. Upon heating, the solder will flow into and between the interface of rails 6 and 7, so that a firm solder connection is obtained. The solder can be provided otherwise along rails 6 and/or 7; also, one may solder the abutting rails or bars from the outside.

FIG. 2 shows, in addition, that a flap 10 extends peripherically from the inside of one edge of split hose 4, reaching under the other edge and, thus, covering the gap. This flap protects parts underneath from hot solder material. Aside from serving as a "drop cloth," flap 10 protects the interior of the hose against moisture and dirt.

The rails 6 and 7 may be made of a synthetic, such as a polyamid. In this case, bonding by means of a suitable adhesive is quite appropriate and useful. Alternatively, they may be welded together dielectrically or by means of ultrasonics. These procedures, however, require supplemental equipment. Soldering of metal (or heating of a hot adhesive) may concur with the heat-shrinking, and the requisite heat can be developed by and derived from the same source.

The rails, as considered thus far, have an L-shaped contour and are embedded. This was found to be very practical, but is not essential. Instead of L-profiles, the bars and rail sections may have a U-shaped cross section, the U lieing sideways.

As shown in FIG. 4, the L-shaped rails are simply placed here onto the interior surface of hose 4 in that the short legs are fastened to the underside of the respective split hose edge. This is simpler, indeed, but one cannot provide a solder-flow-protecting flap; however, such flap may not be needed, e.g., in the case of ultrasonic or dielectric welding of synthetic material rails.

FIG. 3 shows a modified edge construction for the hose which does permit the providing of a flap 10. The edge zones 4a and 4b are thicker here than the hose generally and have a ledge onto which one places simple flat bars 6' and 7'. This configuration is simple, indeed; but anchoring of the rails in the hose material is preferred particularly in cases in which significant mechanical loads are expected.

Figure 7:
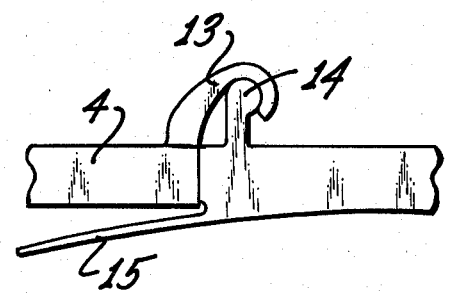
FIG. 7 is an enlarged modification of the fitting, being another preferred embodiment.

The previous examples include similarly constructed rails, L-shaped profiles or flat bars, as the case may be. FIG. 7 shows a different approach. A bent-over-type profiled bar 13 is affixed to one edge of the split hose 4, while a projection with a thick head-like portion 14 extends from and is, possibly, integral with that portion of hose 4. Thus, only one embedded rail is used here (13), while the adjacent edge portion of the hose is appropriately contoured. The connection is made by snapping rail 13 over integral rail 14; rail 13 must be sufficiently resilient accordingly. One should include here also supplemental bonding.

FIG. 7 shows also a flap 15 which is provided here for protection of the interior of the hose against dirt and moisture. Also, drippings of any bonding agent are caught by this flap. It may be advisable to use an abundance of adhesive material to seal the joint.

Figure 8:
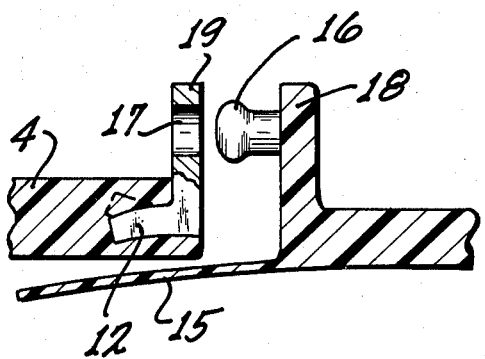
FIG. 8 is another enlarged modification of the fitting, being another preferred embodiment.

FIG. 8 illustrates another example of an asymmetrical edge joint. A first rail element 19 is anchored in one edge of hose 4, having legs 12 to enhance anchoring and a plurality of apertures, such as aperture 17, which face in a peripheral direction. The other edge element may again be integral with the hose proper. An integral bar 18 is provided with snap-action-type buttons 16, respectively facing an aperture 17 of rail 19. Each button has a head that is larger than the respective facing aperture 17, but resiliency of the material permits push-through, and the resilient reaction of the head holds the bar 18 against bar 19. An adhesive may and should be used for sealing and, particularly, for bonding the flat portions of elements 18 and 19 to each other. The flap 15 is provided for protection and covering of the joint area of the split hose.

It should be observed that dovetail anchoring, as per FIG. 6, could be used also here, while legs such as 12 could be used for anchoring the L-shaped rails as afore described. In either case, anchoring and embedding are preferably carried out as the hose is formed, e.g., by extrusion 1 (infra).

The rails are made of strong material, but may have rounded corners and smooth surfaces so that the hose fitting is not damaged in any manner. Notches will not be produced in any of the examples above. It should be noted that closing the joint between the hose edges involves mechanical action between rails or radical outward extensions or protruding bars, not the hose itself.

Figure 9:
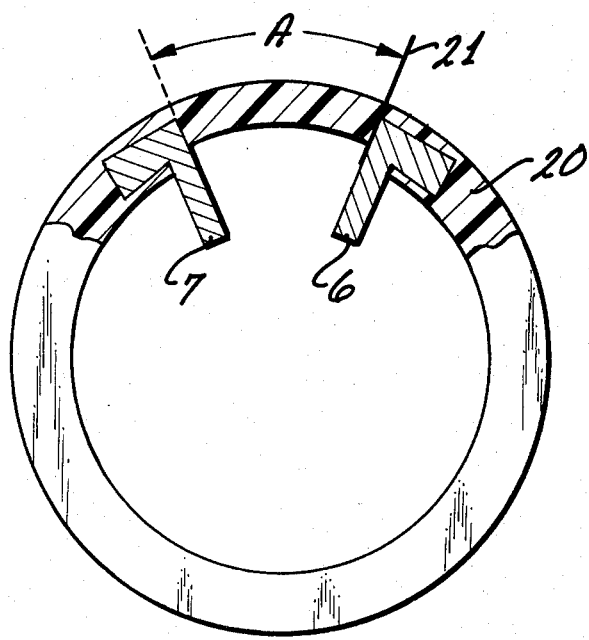
FIG. 9 is a section view through a fitting, during a process stage of making such a fitting.

FIG. 9 depicts an intermediate product and is used to explain more fully the preferred method of making the hose as per the invention. A hose 20 is extruded by means of a suitable extruder, having a head into which the rail elements such as 6 and 7 are inserted and/or fed through. This way, legs 11 (or legs 12 as per FIG. 8) are directly embedded, while the flat bar portions (the long leg of L) project into the interior of the hose as it is being made. The hose is thus made in an inside-out configuration. The rail elements 6 and 7 are spaced by a portion of hose material at a distance A. That portion will become the cover flap.

Upon completion of extrusion (one may extrude hoses in endless fashion and cut axially suitable lengths), the hose is cut in the plane 21, e.g., adjacent to edge bar 6. Next, the hose is turned inside out, resulting in the configuration of FIGS. 1 and 2. It is believed that from a point of view of manufacturing, this constitutes the most practical way of practicing the invention.

In order to enhance the sealing capability of the hose, the outside (as per FIG. 9), which will become the inside of the completed hose, may be covered with an adhesive so that after heat-shrinking of the per se oversized hose, positive bonding is obtained with various parts underneath or, better, on the inside of the fitting.

The material for the hose is perferably cross-linked polyethylene. Cross-linking may be carried out in a known manner, but the so-called siloxane method is preferred. This material can be provided with a memory in that it is cross-linked as it is widened. Upon application of heat it will shrink. Integral bars such as 14 or 18 should not shrink. Thus, they should be excluded from cross-linking, at least until after shrinking. However, preventing these bars from being stretched may well suffice.

The invention has been explained with reference to a fitting for covering a cable splice. However, it can readily be seen that the hose-like fitting can well be used in other environments, such as tube points, or joints between a tube and a fitting, and so forth. Decisive is that the hose can be slipped from the side onto the zone to be covered and can be affixed thereto afterwards.

The invention is not limited to the embodiments described above; but all changes and modifications thereof, not constituting departures from the spirit and scope of the invention, are intended to be included.

We claim:

1. A hose-like fitting for covering cable or tube joints, connection zones, splices, or the like, comprising:
   a split hose element made of a heat-shrinking synthetic material and having edges defining a split joint;
   first and second rail means positively connected respectively to the edges and extending radially outwardly from the hose element, each of the rail means being made of metal to be mechanically a stronger material than the hose; and
   the first and second rail means being metallically bonded to each other directly to effect a connection therebetween which is resistant to compression and tension.

2. A fitting as in claim 1, the rail means being anchored and embedded in the hose material.

3. A fitting as in claim 2, the rail means being of an L-shaped configuration.

4. A fitting as in claim 1, including a flap which extends peripherally from one of the edges, under the other one.

5. A fitting as in claim 1, at least the rail means having a plurality of slots for improving flexibility of the rail means.

6. A fitting as in claim 1, both rail means being made of metal being soldered together.

7. A fitting as in claim 6, at least one of the rail means being provided with means for retaining solder, prior to soldering.

8. A fitting as in claim 7, the rail means being integrally embedded in the edge material.

9. A fitting as in claim 2, wherein the rail has spread legs for being anchored in the hose material.

10. A fitting as in claim 2 or 3, wherein the rail has a dovetail-like portion for being embedded in the hose material.

* * * * *